US011050485B2

(12) United States Patent
Wang et al.

(10) Patent No.: US 11,050,485 B2
(45) Date of Patent: Jun. 29, 2021

(54) HIGH-PRECISION AND LARGE-DYNAMIC-RANGE FAULT MONITORING DEVICE AND METHOD FOR WDM-PON

(71) Applicant: Taiyuan University of Technology, Shanxi (CN)

(72) Inventors: Yuncai Wang, Shanxi (CN); Anbang Wang, Shanxi (CN); Tong Zhao, Shanxi (CN); Bingjie Wang, Shanxi (CN); Peixin He, Shanxi (CN)

(73) Assignee: TAIYUAN UNIVERSITY OF TECHNOLOGY

( * ) Notice: Subject to any disclaimer, the term of this patent is extended or adjusted under 35 U.S.C. 154(b) by 0 days.

(21) Appl. No.: 16/881,170

(22) Filed: May 22, 2020

(65) Prior Publication Data

US 2020/0374002 A1 Nov. 26, 2020

(30) Foreign Application Priority Data

May 26, 2019 (CN) .......................... 201910443092.3

(51) Int. Cl.
*H04B 10/071* (2013.01)
*H04B 10/079* (2013.01)
(Continued)

(52) U.S. Cl.
CPC ....... *H04B 10/0791* (2013.01); *H04B 10/071* (2013.01); *H04B 10/25* (2013.01);
(Continued)

(58) Field of Classification Search
CPC .................................................. H04B 10/071
See application file for complete search history.

(56) References Cited

U.S. PATENT DOCUMENTS

| 8,502,964 | B2 | 8/2013 | Wang et al. |
| 2009/0080880 | A1* | 3/2009 | Lee .......................... H04J 14/02 398/14 |

(Continued)

FOREIGN PATENT DOCUMENTS

| CN | 101226100 | 7/2008 |
| CN | 102291173 | 12/2011 |

OTHER PUBLICATIONS

Li et al., "Distributed Feedbacks for Time-Delay Signature Suppression of Chaos Generated From a Semiconductor Laser", IEEE Photonics Journal, vol. 4, No. 5, pp. 1930-1935, Oct. 2012.
(Continued)

*Primary Examiner* — Shi K Li
(74) *Attorney, Agent, or Firm* — McDonnell Boehnen Hulbert & Berghoff LLP

(57) ABSTRACT

The present invention discloses a high-precision and large-dynamic-range fault monitoring device and method for a WDM-PON. The monitoring device includes a WDM-PON optical network system and an optical network monitoring system. The optical network system includes an OLT I, a feeder fiber II, a 1×n AWG III, a branch fiber IV, and an optical network unit V The optical network monitoring system includes an FP laser, a coupler, an optical coupling device, a photodetector, a signal acquisition and processing device, and an optical feedback device, where the FP laser is connected to the coupler; a large-coupling-ratio output end of the coupler is connected to an input end of the optical coupling device, and a small-coupling-ratio output end of the coupler is connected to an input end of the photodetector; the optical coupling device is installed on the feeder fiber II.

9 Claims, 4 Drawing Sheets

(51) Int. Cl.
*H04B 10/25* (2013.01)
*H04B 10/27* (2013.01)
*H04B 10/50* (2013.01)
*H04J 14/02* (2006.01)

(52) U.S. Cl.
CPC .......... *H04B 10/27* (2013.01); *H04B 10/503* (2013.01); *H04J 14/0242* (2013.01)

(56) References Cited

U.S. PATENT DOCUMENTS

| | | | | |
|---|---|---|---|---|
| 2011/0001959 | A1* | 1/2011 | Hasegawa | H04B 10/071 356/73.1 |
| 2012/0045205 | A1* | 2/2012 | Perron | H04B 10/0795 398/48 |
| 2012/0243863 | A1* | 9/2012 | Zhao | H04B 10/071 398/16 |
| 2014/0077971 | A1* | 3/2014 | Archambault | H04B 10/0731 340/870.04 |
| 2016/0097901 | A1* | 4/2016 | Lu | H04J 14/0282 385/18 |
| 2016/0248499 | A1* | 8/2016 | Perron | H04B 10/071 |
| 2019/0028190 | A1* | 1/2019 | Hou | H04B 10/071 |

OTHER PUBLICATIONS

Rontani et al., "Time-Delay Identification in a Chaotic Semiconductor Laser With Optical Feedback: A Dynamical Point of View", IEEE Journal of Quantum Electronics, vol. 45, No. 7, pp. 879-891, Jul. 2009.

Tkach & Chraplyvy, "Regimes of Feedback Effects in 1.5-um Distributed Feedback Lasers", Journal of Lightwave Technology, vol. LT-4, No. 11, pp. 1655-1661, Nov. 1986.

Wu et al., "Can Fixed Time Delay Signature be Concealed in Chaotic Semiconductor Laser With Optical Feedback?" IEEE Journal of Quantum Electronics, vol. 48, No. 11, pp. 1371-1379, Nov. 2012.

\* cited by examiner

HIGH-PRECISION AND LARGE-DYNAMIC-RANGE FAULT MONITORING DEVICE AND METHOD FOR WDM-PON

TECHNICAL FIELD

The present invention relates to the technical field of network fault monitoring in fiber optic communications, and specifically, to a high-precision and large-dynamic-range fault monitoring device and method for a Wavelength Division Multiplexing-Passive Optical Network (WDM-PON).

BACKGROUND

With the large-scale deployment of optical access networks, the power supply of active devices such as repeaters and switches in active optical networks has become a factor limiting the development of optical networks. As a result, passive optical networks have developed rapidly. The existing passive optical network is mainly composed of an optical line terminal (OLT), a remote node (RN), and an optical network unit. Communication devices are connected through optical fibers to transmit information. Due to the low loss of optical fibers, signals can be transmitted over long distances (over tens of kilometers). In a WDM-PON network, fiber faults usually occur in feeders and branches. In this case, both a single fiber in the feeder and the branch need to be detected, which pose different monitoring requirements. Therefore, the fault monitoring functions are slightly different. The fault monitoring functions are classified into three types based on monitoring methods:

1. Monitor power changes of the transmitted optical signals to determine whether a laser, a feeder, and other devices in the network operate properly. This monitoring method focuses on the timeliness and signal transmission quality, and provides reference for maintenance personnel, but cannot locate faults.

2. Use an optical time domain reflectometer (OTDR) to locate fiber faults. The OTDR initially detects only feeder faults, but with the maturity of the laser manufacturing technologies and arrayed waveguide grating technologies, it can also monitor feeders and branches now.

3. Use other technologies (such as correlation detection) to detect WDM-PON faults. Compared with the OTDR, this method achieves high-precision and wide-range detection, which provides convenience for fault detection personnel.

Although the existing methods implement WDM-PON fault detection, most of them depend on the OTDR, which has some defects when used for fiber fault detection in WDM-PON networks. The major causes are as follows: (1) Structurally, there are multiple branches in the passive optical network. The traditional OTDR uses single pulse light as detection signals. The reflected light and scattered light reflected from each branch are superimposed together, making it difficult to demodulate the OTDR echo signals which probe from the control center. Become a problem. Without any additional information, it is impossible to identify each branch. Moreover, due to the large number of users, measurement time becomes another issue. (2) Theoretically, there is a tradeoff between the spatial resolution and dynamic range of the OTDR. That is, the OTDR needs sufficiently wide optical pulses to ensure the echo power, but the wide pulse width reduces the spatial resolution. The typical detection pulse width of a traditional pulsed OTDR ranges from 10 ns to 1 us, and the corresponding resolution ranges from 1 m to 100 m. Therefore, to use an OTDR to detect a specific fiber fault position, a length difference between the branches must be greater than the resolution. Due to the large number of users, the length of additional fibers to be deployed will increase significantly, and the costs will increase accordingly. This obviously does not meet the requirements for cost-effective detection technologies.

Therefore, for the WDM-PON network, it is necessary to develop a monitoring technology that features high precision, long distance monitoring, and simple structure and can implement real-time monitoring at the control end to accurately identify branches and locate faults without affecting transmission signals.

SUMMARY

The present invention provides a high-precision and large-dynamic-range fault monitoring device and method for a WDM-PON, to identify faulty branches and locate faults in a WDM-PON network.

The present invention is implemented by the following technical solutions: A high-precision and large-dynamic-range fault monitoring device for a WDM-PON includes a WDM-PON optical network system and an optical network monitoring system. The WDM-PON optical network system includes an OLT I, a feeder fiber II, a 1×n arrayed wavelength grating (AWG) III, a branch fiber IV, and an optical network unit V. The OLT I is connected to the 1×n AWG III through the feeder fiber II, and n optical splitting ports of the 1×n AWG III are connected to n input ends of n optical network units V through n branch fibers IV. The optical network monitoring system includes an FP laser, a coupler, an optical coupling device, a photodetector, a signal acquisition and processing device, and an optical feedback device. The FP laser is connected to the coupler; a large-coupling-ratio output end of the coupler is connected to an input end of the optical coupling device, and a small-coupling-ratio output end of the coupler is connected to an input end of the photodetector; the optical coupling device is installed on the feeder fiber II; an output end of the photodetector is connected to an input end of the signal acquisition and processing device; the FP laser, the coupler, the optical coupling device, the photodetector, and the signal acquisition and processing device are all located on the OLT I side; n optical feedback devices are installed on n branch fibers IV, and the n optical feedback devices are located on the side of the n optical network units V; and a distance varies between each optical feedback device and the FP laser, and a minimum difference between the distances is greater than detection resolution, ensuring that correlation curves do not overlap.

A high-precision and large-dynamic-range fault monitoring method for a WDM-PON is implemented in the foregoing device and includes the following steps:

1) After the WDM-PON optical network system and the optical network monitoring system are deployed, perform the following steps:

1.1) The FP laser emits multi-wavelength lasers with wavelengths different from that of a communication signal; the emitted lasers pass through the large-coupling-ratio output end of the coupler, and then are coupled into the feeder fiber II through the optical coupling device, and split into the n branch fibers IV through the 1×n AWG the lasers are transmitted into the n optical feedback devices through the n branch fibers IV, and detection light reflected by the optical feedback devices returns to the FP laser along the same path, and disturbs the FP laser, so that the FP laser generates chaotic signals under the action of optical feedback (the optical feedback device has no impact on the wavelength of the communication signal, and reflects all the detection signals, and wavelengths of the detection signals reflected by different optical feedback devices are different); the optical signals are input into the photodetector through the small-coupling-ratio output end of the coupler; the photodetector converts the optical signal into an electrical signal, and inputs the electrical signal into the signal acquisition and processing device, so that the signal acquisition and processing device collects nonlinear signals dynamically output by the FP laser, performs autocorrelation calculation, and determines an optical network fault based on correlation peaks in an autocorrelation curve.

1.2) The signal acquisition and processing device performs autocorrelation calculation on the received electrical signal and obtains the autocorrelation curve.

1.3) After the fault monitoring system is set up, perform a complete measurement on the optical network system when the optical network is in normal communication. In the autocorrelation curve, multiple correlation peaks appear at different positions except the position of 0 m, where n correlation peaks are in one-to-one correspondence to the n branch fibers IV.

1.4) Disconnect or remove the optical feedback devices in each branch one by one, and repeat steps 1.1) and 1.2). The correlation peaks in the autocorrelation curve become smaller or disappear one by one. Based on this, mark the branch fiber corresponding to each correlation peak in the correlation curve obtained in step 1.3).

2) After the WDM-PON optical network system starts running, perform steps 1.1) and 1.2) repeatedly, and compare an autocorrelation curve obtained each time with the autocorrelation curve acquired in step 1.3). If all n correlation peaks in the autocorrelation curve become smaller or disappear at the same time, it indicates that a fault point is located on the feeder fiber II; and one or more new correlation peaks appear at other positions, and the positions reflect distances between the fault points and the FP laser. If a correlation peak in the autocorrelation curve becomes smaller or disappears, a fault point is located on the branch fiber IV corresponding to the correlation peak, and its position reflects a distance between the fault point and the FP laser. If several p correlation peaks in the autocorrelation curve become smaller or disappear at the same time, fault points are located on p branch fibers IV corresponding to the p correlation peaks, and the positions reflect distances between the fault points and the FP laser. In this case, locate the fault points in these p branch fibers IV one by one according to positions of new correlation peaks, where 1<p<n.

The theoretical basis of the high-precision and large-dynamic-range fault monitoring device and method for a WDM-PON according to the present invention is as follows: Based on a characteristic that a laser signal generated by the FP laser subject to the optical feedback having the time-delay signature, the present invention identifies faulty optical network branches and locates the faults. Nonlinear signals dynamically output by the FP laser have some time-delay signature, which is the time for the signals output by the FP laser to reach a feedback point and then return to the FP laser. In the present invention, a position of a fault can be measured based on a delay of a laser signal reflected by the fault point and a propagation speed of the laser signal over an optical fiber. It should be noted that the FP laser produces a variety of nonlinear oscillations such as single-period, quasi-periodic, and chaotic oscillations under the action of feedback light of different feedback strength (−90 dB at minimum) (Journal of Lightwave Technology, Vol. 4, No. 11, pp. 1655-1661, 1986). Regardless of the oscillation type, the optical intensity signal output by a semiconductor laser with optical feedback always has the time-delay signature. It should also be noted that the time-delay signature is a characteristic response of the FP laser to external feedback light (IEEE Journal of Quantum Electronics, Vol. 45, No. 7, pp. 879-891, 2009), but it has always been suppressed as a negative factor that restricts the application of the FP laser in fields like secure communications (IEEE Photonics Journal, Vol. 4, No. 5, pp. 1930-1935, 2012). By contrast, the present invention makes full use of the delay characteristic to locate fiber faults. In addition, in the present invention, a feature feedback device is configured in each branch to identify the specific branch.

The time-delay signature of the FP laser under the action of optical feedback can be obtained by various methods (see IEEE Journal of Quantum Electronics, Vol. 48, No. 11, pp. 1371-1379, 2012). The most direct way is to perform autocorrelation calculation on the optical output. Positions of side lobes in the calculated autocorrelation curve reflect the delay characteristic of the system (as shown in FIG. 2). The positions of the side lobes are positions of correlation peaks for locating the faults in this method. Positions of the faults can be calculated based on the delay and a propagation speed of light over an optical fiber. In the first measurement, the correlation peaks of the autocorrelation curve corresponding to connection points and feedback points in the entire optical network (that is, the reference curve shown in FIG. 2) are determined. After that, each subsequent monitoring result is completely the same as the curve, and the following three cases also exist:

1. Correlation peaks corresponding to all branches become smaller or disappear, and a new correlation peak appears. This means the feeder is faulty (that is, the feeder fault (fault I) shown in FIG. 3).

2. A correlation peak corresponding to only one branch becomes smaller or disappears, and a new correlation peak appears. This means the branch corresponding to the disappeared correlation peak is faulty (that is, the branch fault (fault II) shown in FIG. 4).

3. Correlation peaks corresponding to multiple branches become smaller or disappear, and a same or even larger number of correlation peaks appear. This means the branches corresponding to the disappeared correlation peaks are faulty (that is, multiple branch faults shown in FIG. 5).

Compared with the prior art, the present invention has the following beneficial effects: The high-precision and large-dynamic-range fault monitoring device and method for a WDM-PON according to the present invention detect WDM-PON network faults based on a characteristic that there are side lobes (a distance between side lobes is related to a distance between two lasers, and the side lobes are correlation peaks) when the FP laser generates chaotic laser signals under the action of optical feedback. The present invention can implement detection at a control center. Featuring high spatial resolution, high sensitivity, large dynamic range, and simple structure, the present invention can be widely applied.

DETAILED DESCRIPTION

The present invention will be further described below in conjunction with specific examples.

Example 1

Figure 1:
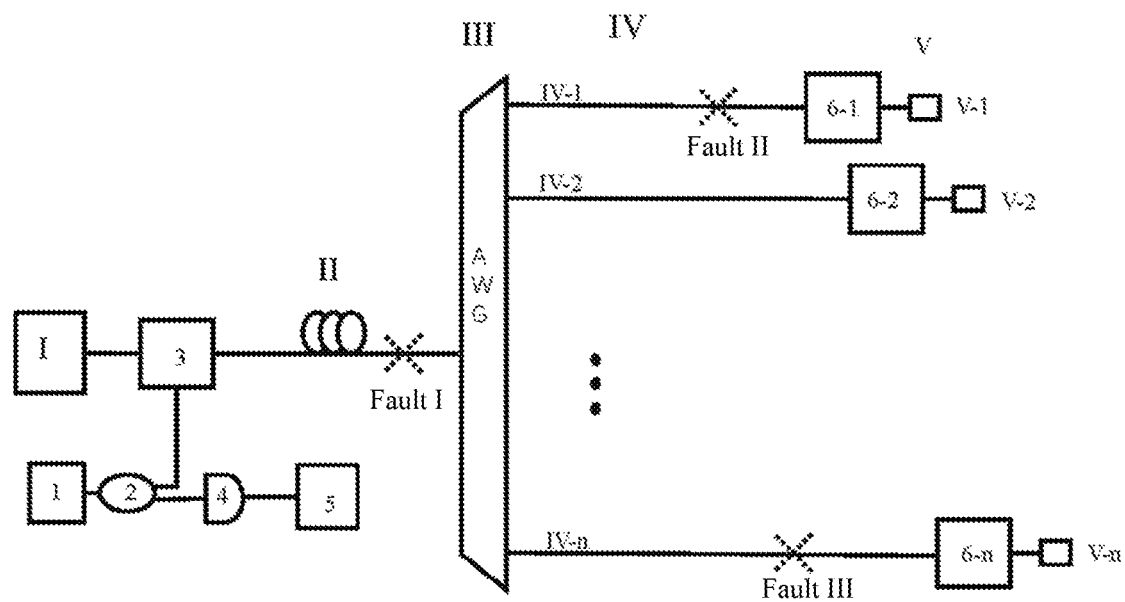
FIG. 1 is a schematic diagram showing a structure of the present invention and faults.
Figure 2:
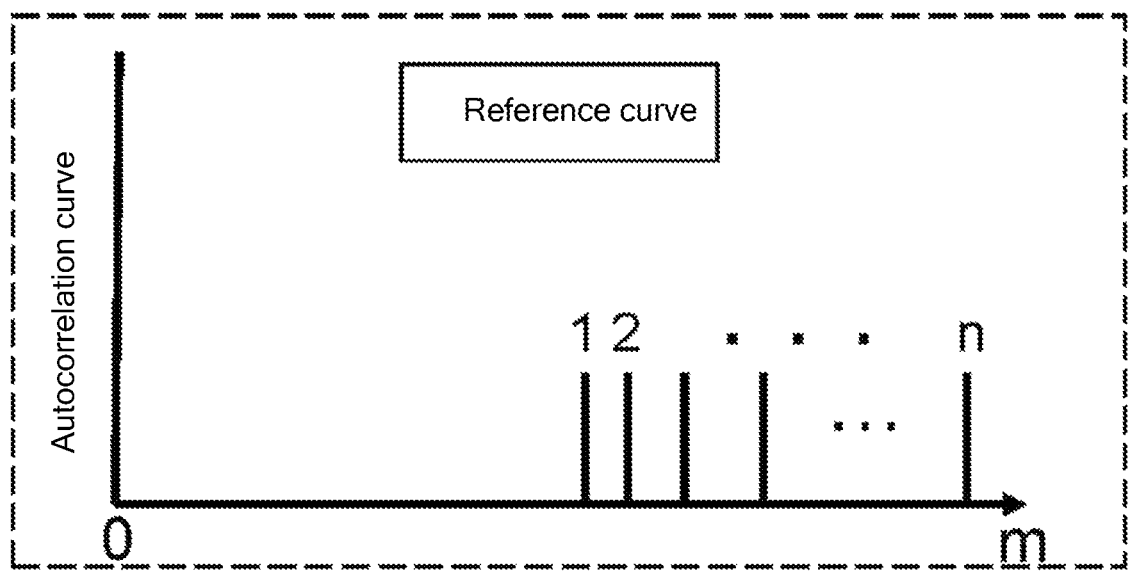
FIG. 2 shows a reference autocorrelation curve according to the present invention.

As shown in FIG. 1, a high-precision and large-dynamic-range fault monitoring device for a WDM-PON includes a WDM-PON optical network system and an optical network monitoring system. The WDM-PON optical network system includes an OLT I, a feeder fiber II, a 1×n AWG III, a branch fiber IV, and an optical network unit V. The OLT I is connected to the 1×n AWG III through the feeder fiber II, and n optical splitting ports of the 1×n AWG III are connected to n input ends of n optical network units V through n branch fibers IV. The optical network monitoring system includes an FP laser 1, a coupler 2, an optical coupling device 3, a photodetector 4, a signal acquisition and processing device 5, and an optical feedback device 6. The FP laser 1 is connected to the coupler 2; a large-coupling-ratio output end of the coupler 2 is connected to an input end of the optical coupling device 3, and a small-coupling-ratio output end of the coupler 2 is connected to an input end of the photodetector 4; the optical coupling device 3 is installed on the feeder fiber II: an output end of the photodetector 4 is connected to an input end of the signal acquisition and processing device 5; the FP laser 1, the coupler 2, the optical coupling device 3, the photodetector 4, and the signal acquisition and processing device 5 are all located on the OLT I side; n optical feedback devices 6 are installed on n branch fibers IV, and the n optical feedback devices 6 are located on the side of the n optical network units V; and a distance varies between each optical feedback device 6 and the FP laser 1, and a minimum difference between the distances is greater than detection resolution, ensuring that correlation curves do not overlap.

In this example, the FP laser supports a wavelength range of 1600 nm to 1700 nm and an output power of 1 mW to 1 W. The coupler 2 is an optical coupler with a coupling ratio of 80:20 to 99:1, which can be selected according to a measurement distance. In this example, an 80:20 optical coupler is selected. The optical coupling device is a wavelength division multiplexer or an optical coupler with a coupling ratio of 50:50. The photodetector is a high-speed photodetector that can respond to signals with a wavelength ranging from 1600 nm to 1700 nm and has a bandwidth of less than 50 GHz. The signal acquisition and processing device consists of a single-channel signal acquisition device with a bandwidth of less than 50 GHz and a digital correlator or computer that can perform autocorrelation calculation. The optical feedback device 6 consists of a wavelength division multiplexer and a fiber reflector that can reflect signals with a wavelength ranging from 1600 nm to 1700 nm.

A high-precision and large-dynamic-range fault monitoring method for a WDM-PON is implemented in the device in this example, and includes the following steps:

1) After the WDM-PON optical network system and the optical network monitoring system are deployed, perform the following steps:

1.1) The FP laser 1 emits multi-wavelength lasers with wavelengths different from that of a communication signal; the emitted lasers pass through the large-coupling-ratio output end of the coupler 2, and then are coupled into the feeder fiber II through the optical coupling device 3, and split into the n branch fibers IV through the 1×n AWG III; the lasers are transmitted into the n optical feedback devices 6 through the n branch fibers IV, and detection light reflected by the optical feedback devices 6 returns to the FP laser 1 along the same path, and disturbs the FP laser 1, so that the FP laser 1 generates chaotic signals under the action of optical feedback; light is input into the photodetector 4 through the small-coupling-ratio output end of the coupler 2; the photodetector 4 converts the optical signal into an electrical signal, and inputs the electrical signal into the signal acquisition and processing device 5, so that the signal acquisition and processing device 5 collects nonlinear signals dynamically output by the FP laser 1, performs autocorrelation calculation, and determines an optical network fault based on correlation peaks in an autocorrelation curve.

1.2) The signal acquisition and processing device 5 performs autocorrelation calculation on the received electrical signal and obtains the autocorrelation curve.

1.3) After the fault monitoring system is set up, perform a complete measurement on the optical network system when the optical network is in normal communication. In the autocorrelation curve, multiple correlation peaks appear at different positions except the position of 0 m, where n correlation peaks are in one-to-one correspondence to the n branch fibers IV.

1.4) Disconnect or remove the optical feedback devices in each branch one by one, and repeat steps 1.1) and 1.2). The correlation peaks in the autocorrelation curve become smaller or disappear one by one. Based on this, mark the branch fiber corresponding to each correlation peak in the correlation curve obtained in step 1.3).

Figure 3:
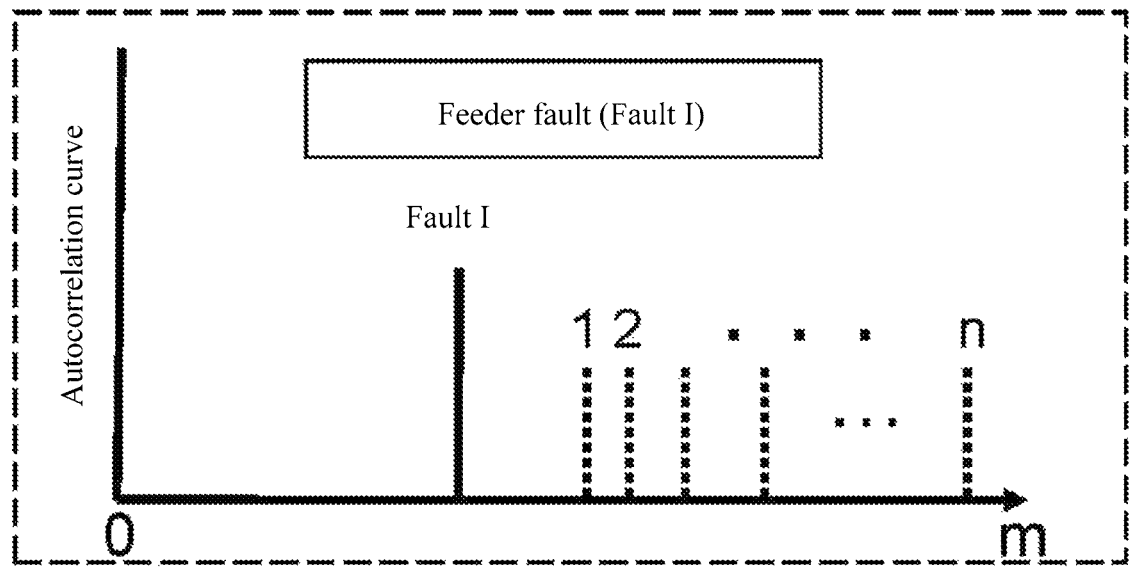
FIG. 3 shows an autocorrelation curve for a feeder fault.
Figure 4:
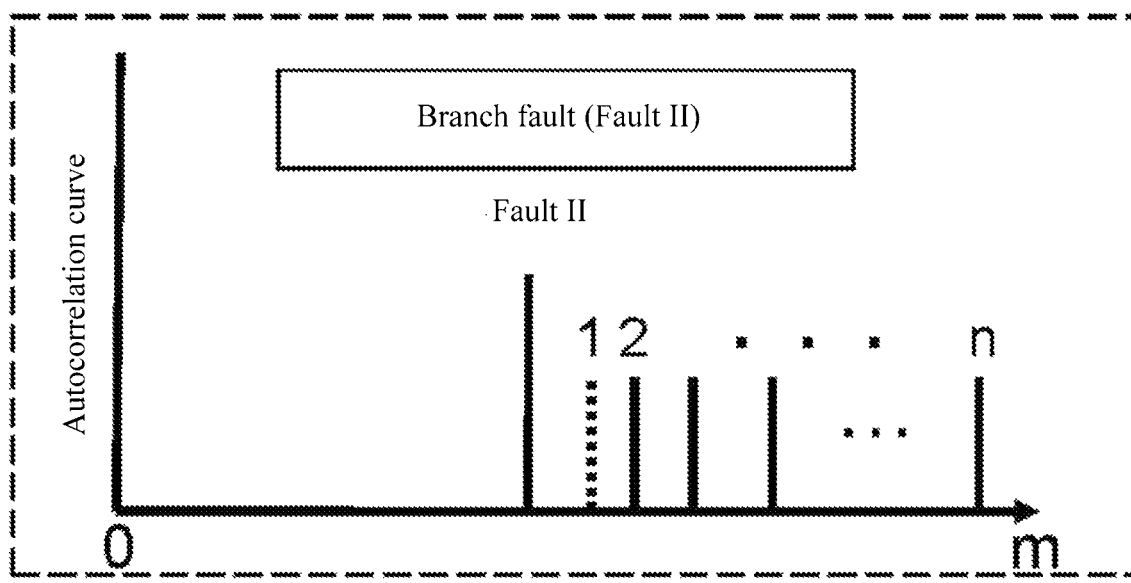
FIG. 4 shows an autocorrelation curve for a branch fault.
Figure 5:
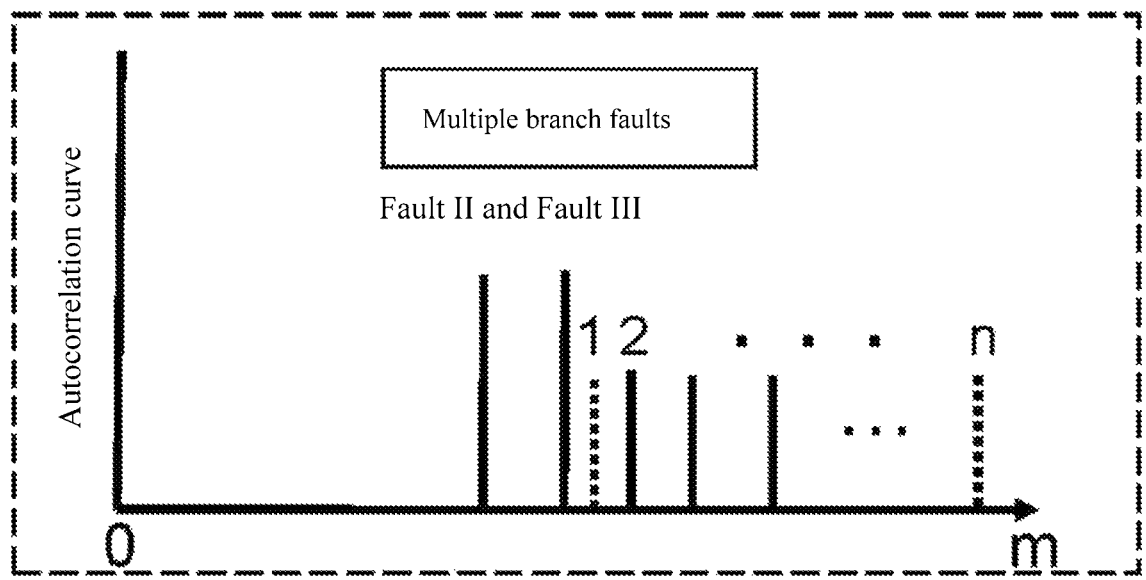
FIG. 5 shows an autocorrelation curve for multiple branch faults.
Figure 6:
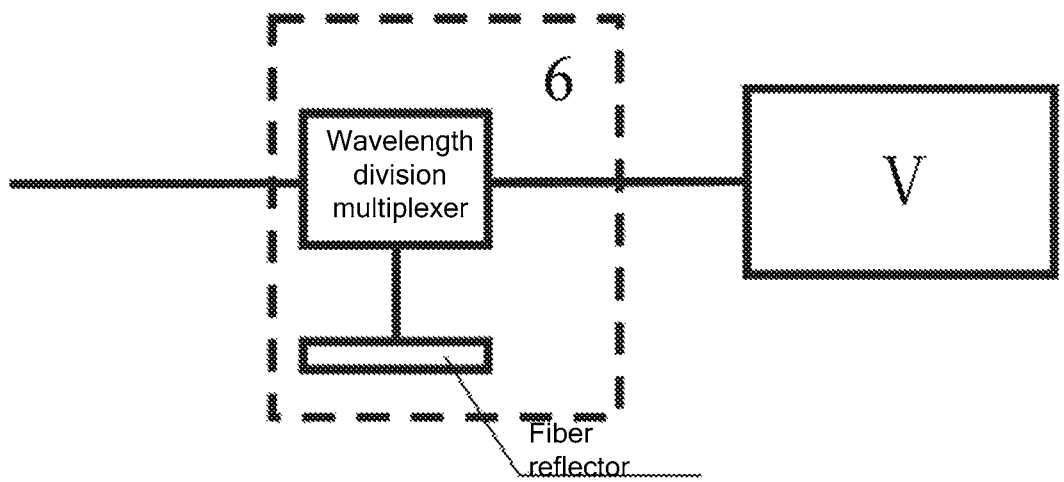
FIG. 6 is a first schematic structural diagram of an optical feedback device.
Figure 7:
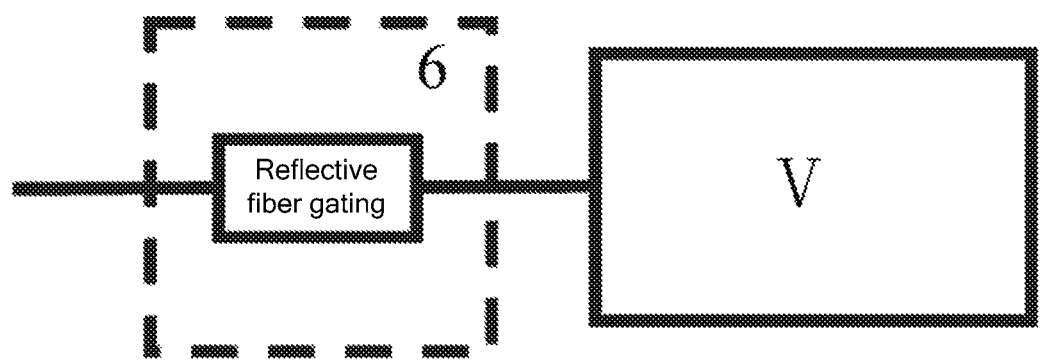
FIG. 7 is a second schematic structural diagram of an optical feedback device.

2) After the WDM-PON optical network system starts running, perform steps 1.1) and 1.2) repeatedly, and compare an autocorrelation curve obtained each time with the autocorrelation curve acquired in step 1.3). If all n correlation peaks in the autocorrelation curve become smaller or disappear at the same time, a fault point is located on the feeder fiber II; and one or more new correlation peaks appear at other positions, and the positions reflect distances between the fault points and the FP laser 1, as shown in FIG. 3. If a correlation peak in the autocorrelation curve becomes smaller or disappears, a fault point is located on the branch fiber IV corresponding to the correlation peak, and its position reflects a distance between the fault point and the FP laser 1, as shown in FIG. 4. If p (1<p<n) correlation peaks in the autocorrelation curve become smaller or disappear at the same time, fault points are located on p branch fibers IV corresponding to the p correlation peaks, and the positions reflect distances between the fault points and the FP laser 1. In this case, locate the fault points in these p branch fibers IV one by one according to positions of new correlation peaks, as shown in FIG. 5.

Example 2

As shown in FIG. 1, a high-precision and large-dynamic-range fault monitoring device for a WDM-PON includes a WDM-PON optical network system and an optical network monitoring system. The WDM-PON optical network system includes an OLT I, a feeder fiber II, a 1×n AWG a branch fiber IV, and an optical network unit V The OLT I is connected to the 1×n AWG III through the feeder fiber II, and n optical splitting ports of the 1×n AWG III are connected to n input ends of n optical network units V through n branch fibers IV. The optical network monitoring system includes an FP laser 1, a coupler 2, an optical coupling device 3, a photodetector 4, a signal acquisition and processing device 5, and an optical feedback device 6. The FP laser 1 is connected to the coupler 2; a large-coupling-ratio output end of the coupler 2 is connected to an input end of the optical coupling device 3, and a small-coupling-ratio output end of the coupler 2 is connected to an input end of the photodetector 4; the optical coupling device 3 is installed on the feeder fiber II; an output end of the photodetector 4 is connected to an input end of the signal acquisition and processing device 5; the FP laser 1, the coupler 2, the optical coupling device 3, the photodetector 4, and the signal acquisition and processing device 5 are all located on the OLT I side: n optical feedback devices 6 are installed on n branch fibers IV, and the n optical feedback devices 6 are located on the side of the n optical network units V; and a distance varies between each optical feedback device 6 and the FP laser 1, and a minimum difference between the distances is greater than detection resolution, ensuring that correlation curves do not overlap.

In this example, the FP laser supports a wavelength range of 1600 nm to 1700 nm, and an output power of 1 mW to 1 W. The coupler 2 is an optical coupler with a coupling ratio of 80:20 to 99:1, which can be selected according to a measurement distance. In this example, a 99:1 optical coupler is selected. The optical coupling device is a wavelength division multiplexer or an optical coupler with a coupling ratio of 50:50. The photodetector is a high-speed photodetector that can respond to a signal with a wavelength ranging from 1600 nm to 1700 nm and has a bandwidth of less than 50 GHz. The signal acquisition and processing device consists of a single-channel signal acquisition device with a bandwidth of less than 50 GHz and a digital correlator or computer that can perform autocorrelation calculation. The optical feedback device 6 is a reflective fiber grating with a wavelength ranging from 1600 nm to 1700 nm.

A high-precision and large-dynamic-range fault monitoring method for a WDM-PON is implemented in the device in this example, and includes the following steps:

1) After the WDM-PON optical network system and the optical network monitoring system are deployed, perform the following steps:

1.1) The FP laser 1 emits multi-wavelength lasers with wavelengths different from that of a communication signal; the emitted lasers pass through the large-coupling-ratio output end of the coupler 2, and then are coupled into the feeder fiber II through the optical coupling device 3, and split into the n branch fibers IV through the 1×n AWG III; the lasers are transmitted into the n optical feedback devices 6 through the n branch fibers IV, and detection light reflected by the optical feedback devices 6 returns to the FP laser 1 along the same path, and disturbs the FP laser 1, so that the FP laser 1 generates chaotic signals under the action of optical feedback; light is input into the photodetector 4 through the small-coupling-ratio output end of the coupler 2; the photodetector 4 converts the optical signal into an electrical signal, and inputs the electrical signal into the signal acquisition and processing device 5, so that the signal acquisition and processing device 5 collects nonlinear signals dynamically output by the FP laser 1, performs auto-correlation calculation, and determines an optical network fault based on correlation peaks in an autocorrelation curve.

1.2) The signal acquisition and processing device 5 performs autocorrelation calculation on the received electrical signal and obtains the autocorrelation curve.

1.3) After the fault monitoring system is set up, perform a complete measurement on the optical network system when the optical network is in normal communication. In the autocorrelation curve, multiple correlation peaks appear at different positions except the position of 0 m, where n correlation peaks are in one-to-one correspondence to the n branch fibers IV.

1.4) Disconnect or remove the optical feedback devices in each branch one by one, and repeat steps 1.1) and 1.2). The correlation peaks in the autocorrelation curve become smaller or disappear one by one. Based on this, mark the branch fiber corresponding to each correlation peak in the correlation curve obtained in step 1.3).

2) After the WDM-PON optical network system starts running, perform steps 1.1) and 1.2) repeatedly, and compare an autocorrelation curve obtained each time with the autocorrelation curve acquired in step 1.3). If all n correlation peaks in the autocorrelation curve become smaller or disappear at the same time, a fault point is located on the feeder fiber II; and one or more new correlation peaks appear at other positions, and the positions reflect distances between the fault points and the FP laser 1, as shown in FIG. 3. If a correlation peak in the autocorrelation curve becomes smaller or disappears, a fault point is located on the branch fiber IV corresponding to the correlation peak, and its position reflects a distance between the fault point and the FP laser 1, as shown in FIG. 4. If p ($1<p<n$) correlation peaks in the autocorrelation curve become smaller or disappear at the same time, fault points are located on p branch fibers IV corresponding to the p correlation peaks, and the positions reflect distances between the fault points and the FP laser 1. In this case, locate the fault points in these p branch fibers IV according to positions of new correlation peaks, as shown in FIG. 5.

Example 3

As shown in FIG. 1, a device for accurately monitoring WDM-PON faults within a large dynamic range includes a WDM-PON optical network system and an optical network monitoring system. The WDM-PON optical network system includes an OLT I, a feeder fiber II, a 1:n AWG III, a branch fiber IV and an optical network unit V The OLT I is connected to the 1:n AWG III through the feeder fiber II, and n optical splitting ports of the 1:n AWG III are connected to n input ends of n optical network units V in a one-to-one correspondence through n branch fibers IV The optical network monitoring system includes an FP laser 1, a coupler 2, an optical coupling device 3, a photodetector 4, a signal acquisition and processing device 5, and an optical feedback device 6. The FP laser 1 is connected to the coupler 2; a large-coupling-ratio output end of the coupler 2 is connected to an input end of the optical coupling device 3, and a small-coupling-ratio output end of the coupler 2 is connected to an input end of the photodetector 4; the optical coupling device 3 is installed on the feeder fiber II; an output end of the photodetector 4 is connected to an input end of the signal acquisition and processing device 5; the FP laser 1, the coupler 2, the optical coupling device 3, the photodetector 4, and the signal acquisition and processing device 5 are all located on the OLT I side; n optical feedback devices 6 are installed on n branch optical fibers IV in a one-to-one correspondence, and the n optical feedback devices 6 are located on the side of the n optical network units V; and a distance varies between each optical feedback device 6 and the FP laser 1, and a minimum difference between the distances is greater than detection resolution, ensuring that the correlation curves do not overlap.

In this example, the FP laser supports a wavelength range of 1600 nm to 1700 nm, and an output power of 1 mW to 1 W. The coupler 2 is an optical coupler with a coupling ratio of 80:20 to 99:1, which can be selected according to a measurement distance. In this example, an 80:20 optical coupler is selected. The optical coupling device is a wavelength division multiplexer or an optical coupler with a coupling ratio of 50:50. The photodetector is a high-speed photodetector that can respond to signals with a wavelength ranging from 1600 nm to 1700 nm and has a bandwidth of less than 50 GHz. The signal acquisition and processing device consists of a single-channel signal acquisition device with a bandwidth of less than 50 GHz and a digital correlator or computer that can perform autocorrelation calculation. The optical feedback device 6 is a high-reflection film that is plated on an end face of the branch fiber IV connected to the optical network unit and can reflect signals with a wavelength ranging from 1600 nm to 1700 nm.

A high-precision and large-dynamic-range fault monitoring method for a WDM-PON is implemented in the device in this example, and includes the following steps:

1) After the WDM-PON optical network system and the optical network monitoring system are deployed, perform the following steps:

1.1) The FP laser 1 emits multi-wavelength lasers with wavelengths different from that of a communication signal; the emitted lasers pass through the large-coupling-ratio output end of the coupler 2, and then are coupled into the feeder fiber II through the optical coupling device 3, and split into the n branch fibers IV through the 1×n AWG the lasers are transmitted into the n optical feedback devices 6 through the n branch fibers IV, and detection light reflected by the optical feedback devices 6 returns to the FP laser 1 along the same path, and disturbs the FP laser 1, so that the FP laser 1 generates chaotic signals under the action of optical feedback; light is input into the photodetector 4 through the small-coupling-ratio output end of the coupler 2; the photodetector 4 converts the optical signal into an electrical signal, and inputs the electrical signal into the signal acquisition and processing device 5, so that the signal acquisition and processing device 5 collects nonlinear signals dynamically output by the FP laser 1, performs autocorrelation calculation, and determines an optical network fault based on correlation peaks in an autocorrelation curve.

1.2) The signal acquisition and processing device 5 performs autocorrelation calculation on the received electrical signal and obtains the autocorrelation curve.

1.3) After the fault monitoring system is set up, perform a complete measurement on the optical network system when the optical network is in normal communication. In the autocorrelation curve, multiple correlation peaks appear at different positions except the position of 0 in, where n correlation peaks are in one-to-one correspondence to the n branch fibers IV.

1.4) Disconnect or remove the optical feedback devices in each branch one by one, and repeat steps 1.1) and 1.2). The correlation peaks in the autocorrelation curve become smaller or disappear one by one. Based on this, mark the branch fiber corresponding to each correlation peak in the correlation curve obtained in step 1.3).

2) After the WDM-PON optical network system starts running, perform steps 1.1) and 1.2) repeatedly, and compare an autocorrelation curve obtained each time with the autocorrelation curve in step 1.3). If n correlation peaks in the autocorrelation curve become smaller or disappear at the same time, a fault point is located on the feeder fiber II; and one or more new correlation peaks appear at other positions, and the positions reflect distances between the fault points and the FP laser 1, as shown in FIG. 3. If a correlation peak in the autocorrelation curve becomes smaller or disappears, a fault point is located on the branch fiber IV corresponding to the correlation peak, and its position reflects a distance between the fault point and the FP laser 1, as shown in FIG. 4. If p (1<p<n) correlation peaks in the autocorrelation curve become smaller or disappear at the same time, fault points are located on p branch fibers IV corresponding to the p correlation peaks, and the positions reflect distances between the fault points and the FP laser 1. In this case, locate the fault points in these p branch fibers IV according to positions of new correlation peaks, as shown in FIG. 5.

The scope of protection claimed by the present invention is not limited to the foregoing specific implementations, and for those skilled in the art, the present invention may have many variations and modifications. Any modification, improvement, and equivalent replacement made within the concept and principle of the present invention shall fall within the protection scope of the present invention.

What is claimed is:

1. A high-precision and large-dynamic-range fault monitoring device for a Wavelength Division Multiplexing-Passive Optical Network (WDM-PON), comprising a WDM-PON optical network system and an optical network monitoring system, wherein the WDM-PON optical network system comprises an optical line terminal (OLT) I, a feeder fiber II, a 1×n arrayed wavelength grating (AWG) III, a branch fiber IV, and an optical network unit V, wherein the OLT I is connected to the 1×n AWG III through the feeder fiber II, and n optical splitting ports of the 1×n AWG III are connected to n input ends of n optical network units V through n branch fibers IV; and the optical network monitoring system comprises an FP laser (1), a coupler (2), an optical coupling device (3), a photodetector (4), a signal acquisition and processing device (5), and an optical feedback device (6), wherein the FP laser (1) is connected to the coupler (2); a large-coupling-ratio output end of the coupler (2) is connected to an input end of the optical coupling device (3), and a small-coupling-ratio output end of the coupler (2) is connected to an input end of the photodetector (4); the optical coupling device (3) is installed on the feeder fiber II; an output end of the photodetector (4) is connected to an input end of the signal acquisition and processing device (5); the FP laser (1), the coupler (2), the optical coupling device (3), the photodetector (4), and the signal acquisition and processing device (5) are all located on the OLT I side; n optical feedback devices (6) are installed on n branch fibers IV, and the n optical feedback devices (6) are located on the side of the n optical network units V, detection light reflected by the optical feedback devices (6) returns to the FP laser (1) along the same path, and disturbs the FP laser (1), so that the FP laser (1) generates a chaotic signal under the action of optical feedback; a distance varies between each optical feedback device (6) and the FP laser (1), and a minimum difference between the distances is greater than detection resolution, ensuring that the correlation curves do not overlap; the signal acquisition and processing device (5) collects a nonlinear chaotic signal dynamically output by the FP laser (1), performs autocorrelation calculation, and determines an optical network fault based on correlation peaks in an autocorrelation curve.

2. The high-precision and large-dynamic-range fault monitoring device for a WDM-PON according to claim 1, wherein the FP laser (1) supports a wavelength range of 1600 nm to 1700 nm, and an output power of 1 mW to 1 W; the coupler (2) is an optical coupler with a coupling ratio of 80:20 to 99:1; the optical coupling device (3) is a wavelength division multiplexer or an optical coupler with a coupling ratio of 50:50; the photodetector (4) is a high-speed photodetector that can respond to signals with a wavelength ranging from 1600 nm to 1700 nm and has a bandwidth of less than 50 GHz; and the signal acquisition and processing device (5) comprises a single-channel signal acquisition device with a bandwidth of less than 50 GHz and a digital correlator or computer that can perform autocorrelation calculation.

3. The high-precision and large-dynamic-range fault monitoring device for a WDM-PON according to claim 1, wherein the optical feedback device (6) comprises a wavelength division multiplexer and a fiber reflector that can reflect signals with a wavelength ranging from 1600 nm to 1700 nm, and reflects all detection signals without any impacts on communication signal wavelengths.

4. The high-precision and large-dynamic-range fault monitoring device for a WDM-PON according to claim 2, wherein the optical feedback device (6) comprises a wavelength division multiplexer and a fiber reflector that can reflect signals with a wavelength ranging from 1600 nm to 1700 nm, and reflects all detection signals without any impacts on communication signal wavelengths.

5. The high-precision and large-dynamic-range fault monitoring device for a WDM-PON according to claim 1, wherein the optical feedback device (6) is a reflective fiber grating with a wavelength range of 1600 nm to 1700 nm.

6. The high-precision and large-dynamic-range fault monitoring device for a WDM-PON according to claim 2, wherein the optical feedback device (6) is a reflective fiber grating with a wavelength range of 1600 nm to 1700 nm.

7. The high-precision and large-dynamic-range fault monitoring device for a WDM-PON according to claim 1, wherein the optical feedback device (6) is a high-reflection film that is plated on an end face of the branch fiber IV connected to the optical network unit and can reflect signals with a wavelength ranging from 1600 nm to 1700 nm.

8. The high-precision and large-dynamic-range fault monitoring device for a WDM-PON according to claim 2, wherein the optical feedback device (6) is a high-reflection film that is plated on an end face of the branch fiber IV connected to the optical network unit and can reflect signals with a wavelength ranging from 1600 nm to 1700 nm.

9. A high-precision and large-dynamic-range fault monitoring method for a WDM-PON, wherein the method is implemented in the high-precision and large-dynamic-range fault monitoring device for a WDM-PON according to claim 1, and comprises the following steps:
   1) after the WDM-PON optical network system and the optical network monitoring system are deployed, performing the following steps:
      1.1) the FP laser (1) emits multi-wavelength lasers with different wavelengths from a communication signal; the emitted lasers pass through the large-coupling-ratio output end of the coupler (2), and then are coupled into the feeder fiber II through the optical coupling device (3), and split into n branch fibers IV through the 1×n AWG III; the lasers are transmitted into the n optical feedback devices (6) through the n branch fibers IV, and detection light reflected by the optical feedback devices (6) returns to the FP laser (1) along the same path, and disturbs the FP laser (1), so that the FP laser (1) generates a chaotic signal under the action of optical feedback; the light is input into the photodetector (4) through the small-coupling-ratio output end of the coupler (2); the photodetector (4) converts the optical signal into an electrical signal, and inputs the electrical signal into the signal acquisition and processing device (5), so that the signal acquisition and processing device (5) collects nonlinear signals dynamically output by the FP laser (1), performs autocorrelation calculation, and determines an optical network fault based on correlation peaks in an autocorrelation curve;
      1.2) the signal acquisition and processing device (5) performs autocorrelation calculation on the received electrical signal and obtains the autocorrelation curve;
      1.3) after the fault monitoring system is set up, performing a complete measurement on the optical network system when the optical network is in normal communication, wherein in the autocorrelation curve, multiple correlation peaks appear at different positions except the position of 0 m, wherein n correlation peaks are in one-to-one correspondence to the n branch fibers IV;
      1.4) disconnecting or removing the optical feedback devices in each branch one by one, and repeating steps 1.1) and 1.2); wherein the correlation peaks in the autocorrelation curve become smaller or disappear one by one; and based on this, mark the branch fiber corresponding to each correlation peak in the correlation curve obtained in step 1.3);
   2) after the WDM-PON optical network system starts running, performing steps 1.1) and 1.2) repeatedly, and comparing an autocorrelation curve obtained each time with the autocorrelation curve acquired in step 1.3), wherein all n correlation peaks in the autocorrelation curve become smaller or disappear at the same time, a fault point is located on the feeder fiber II;
   and one or more new correlation peaks appear at other positions, and the positions reflect distances between the fault points and the FP laser (1); if a correlation peak in the autocorrelation curve becomes smaller or disappears, a fault point is located on the branch fiber IV corresponding to the correlation peak, and its position reflects a distance between the fault point and the FP laser (1); if several p correlation peaks in the autocorrelation curve become smaller or disappear at the same time, fault points are located on p branch fibers IV corresponding to the p correlation peaks, and the positions reflect distances between the fault points and the FP laser (1); and in this case, locating the fault points on the these p branch fibers IV one by one according to positions of new correlation peaks, wherein $1<p<n$.

* * * * *